United States Patent [19]

Yokoe et al.

[11] Patent Number: 5,481,367

[45] Date of Patent: Jan. 2, 1996

[54] PRINTING APPARATUS CAPABLE OF CHANGING PRINT FORMAT

[75] Inventors: Yoshinori Yokoe; Yuji Hattori, both of Nagoya, Japan

[73] Assignee: Brother Kogyo Kabushiki Kaisha, Nagoya, Japan

[21] Appl. No.: 190,489

[22] Filed: Feb. 2, 1994

[30] Foreign Application Priority Data

Mar. 30, 1993 [JP] Japan .................................. 5-071586

[51] Int. Cl.$^6$ .................................................. G03G 15/36
[52] U.S. Cl. ........................ 358/296; 347/240; 395/112
[58] Field of Search .................................. 358/296, 404, 358/523; 346/160; 355/202; 382/57; 395/112; 347/240

[56] References Cited

U.S. PATENT DOCUMENTS

| | | | |
|---|---|---|---|
| 4,627,748 | 12/1986 | Mizuno et al. | 395/112 |
| 4,707,715 | 11/1987 | Miura et al. | 347/139 |
| 4,769,110 | 9/1988 | Ohno et al. | 156/384 |
| 4,825,405 | 4/1989 | Makino et al. | 400/61 |
| 4,989,042 | 1/1991 | Muramatsu et al. | 355/202 |

FOREIGN PATENT DOCUMENTS 59-83685  5/1984  Japan .

*Primary Examiner*—Benjamin R. Fuller
*Assistant Examiner*—Raquel Yvette Gordon
*Attorney, Agent, or Firm*—Oliff & Berridge

[57] ABSTRACT

There is disclosed a printing apparatus implemented as a laser printer capable of changing the print format when outputting print data. When the operator changes the print format at the printer, the CPU changes the print data in a text buffer of a built-in RAM according to the changed print format, the data being converted into image data in a dot pattern for storage into an image buffer. The operator then pushes a reprint key, causing the CPU to read the pages of print data stored in the image buffer for outputting to a laser printer engine via a printer engine interface for reprinting. The printing apparatus allows the print format to be changed easily for efficient reprinting of the last print data in the new format without the need for the host computer to supply the same print data again.

14 Claims, 2 Drawing Sheets

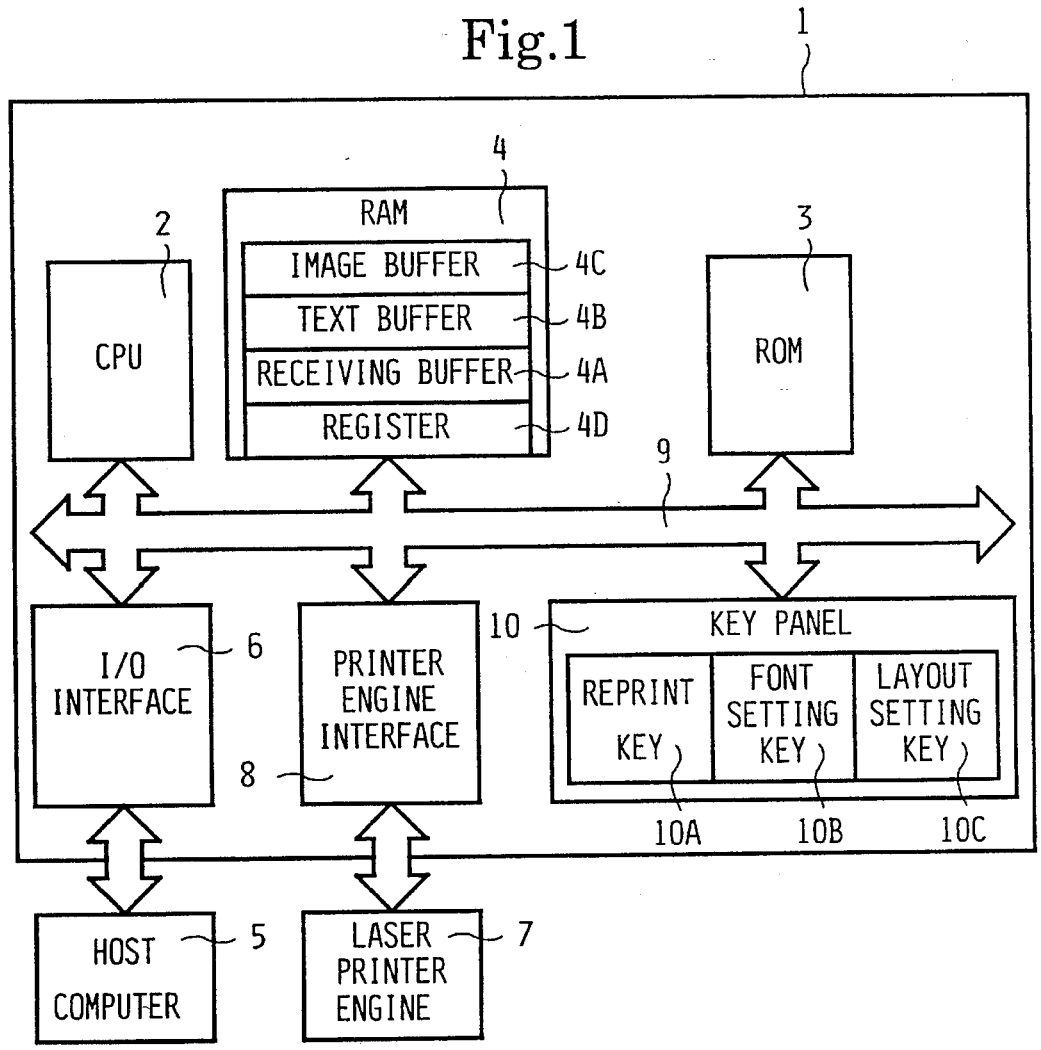

PRINTING APPARATUS CAPABLE OF CHANGING PRINT FORMAT

BACKGROUND OF THE INVENTION

1. Field of the Invention

The invention relates to a printing apparatus capable of changing the print format when outputting print data.

2. Description of the Related Art

Conventionally, printing apparatuses such as laser printers have one page of print data kept in an image buffer until new text data is sent from a receiving buffer of a built-in RAM. Some printers take advantage of this state in offering a reprinting function, whereby the same print data most recently printed is reprinted easily. The reprinting function is initiated by a simple key operation on the side of the printer independently of the host computer so as to reprint the contents of the print data currently held in the image buffer.

Printers having the above capability need only let themselves be operated in a simplified manner when reprinting the most recently printed data in a short time. There is no need to have the print data processed by or sent from the host computer repeatedly.

However, it may happen that the operator, having looked at the printout sheet, wants to have the same contents reprinted using a different font or in a different print layout. This poses a problem for conventional printers.

Where print data needs to be reprinted, not with the contents thereof modified but after a simple change in print format such as the use of a different font, the printer with the conventional reprinting function still requires its host computer to supply it with the same print data after setting the desired font. Thus, it takes time to obtain the desired printout, with the operator having to perform additional steps to execute the reprint-related operation.

SUMMARY OF THE INVENTION

It is therefore an object of the invention to provide a printing apparatus capable of allowing the print format to be changed as needed in order to boost the efficiency of printing.

In carrying out the invention and according to one aspect thereof, there is provided a printing apparatus comprising: a memory for storing at least one printout page of print data fed from an external device; printing means for printing the print data stored in the memory; print format setting means for setting a print format in which the print data stored in the memory is printed; print control means for reading the print data from the memory for printing by the printing means; and print data converting means for converting the print data into a changed print format if the print format for the print data stored in the memory is changed by the print format setting means.

In operation, the printing apparatus, as described above, receives print data from the external device and stores at least one printout page of the data into the memory. When the print format setting means sets a print format for the print data held in the memory, the print data converting means converts the print data according to the changed print format. The print control means orders the printing means to read the data from the memory for printing by the printing means.

As outlined, the printing apparatus according to the invention allows the print format to be changed upon printing so that the operator may readily obtain a printout having the desired print format in a short time. This enhances the efficiency of printing significantly.

These and other objects, features and advantages of the invention will become more apparent upon a reading of the following description and appended drawings.

BRIEF DESCRIPTION OF THE DRAWINGS

A preferred embodiment of the invention will be described in detail with reference to the following figures, wherein:

FIG. 1 is a block diagram of a printing apparatus embodying the invention;

FIG. 2 is a schematic view of the contents of the register in the embodiment.

DETAILED DESCRIPTION OF THE PREFERRED EMBODIMENTS

Figure 3:
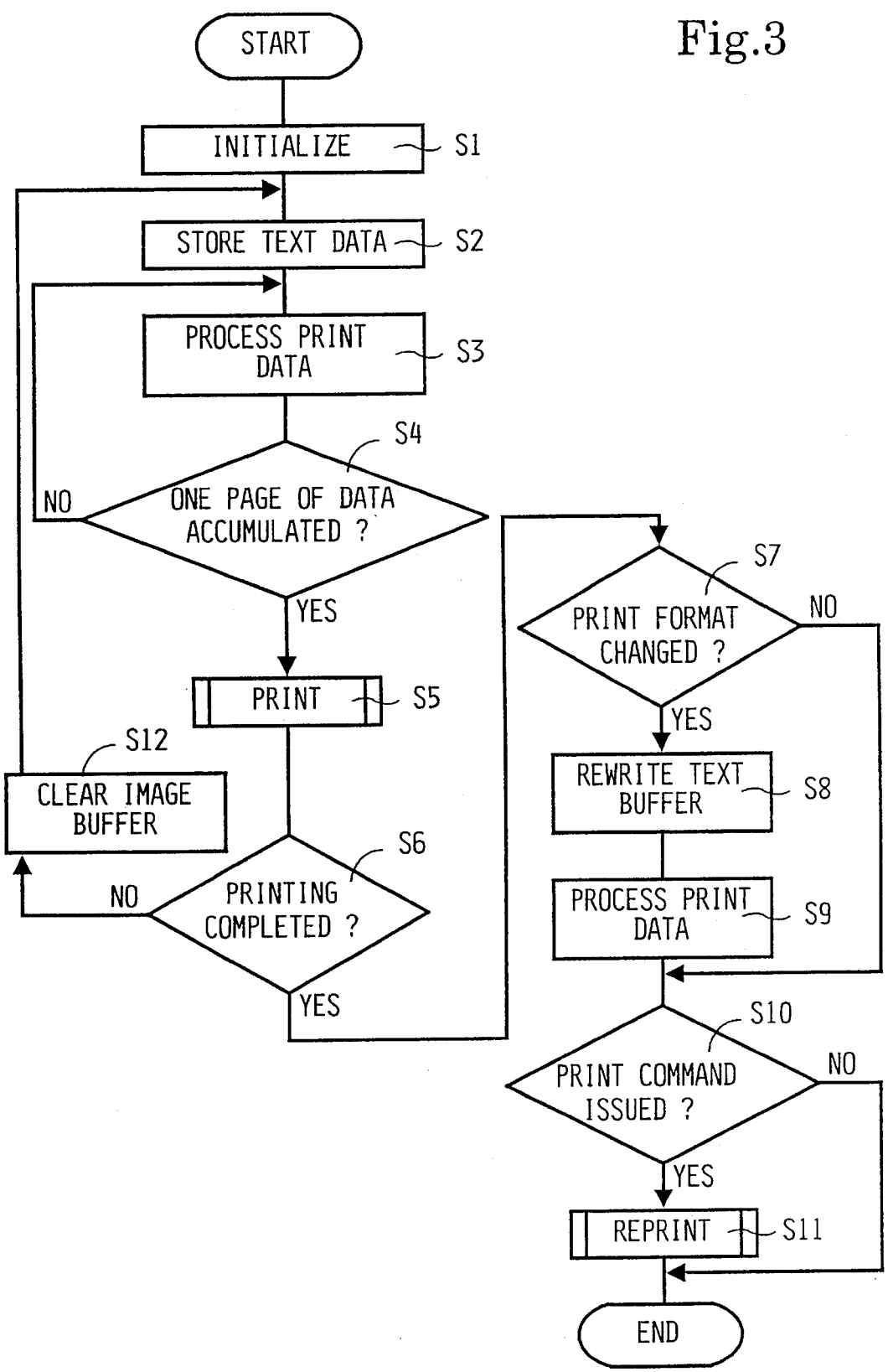
FIG. 3 is a flowchart of steps in which a controller in the embodiment works.

A preferred embodiment of the invention will now be described with reference to the accompanying drawings. FIG. 1 is a block diagram outlining the electrical structure of a controller 1 used by a laser printer embodying the invention. The controller 1 comprises a CPU 2 that controls the laser printer as a whole, a ROM 3 that stores a main control program and the control program whose operating steps are shown in the flowchart of FIG. 3, a RAM 4, an I/O interface 6 that interfaces to a host computer 5, a printer engine interface 8 that interfaces to a laser printer engine 7, a key panel 10 that has keys for designating various commands, and a bus 9 that interconnects these components.

The RAM 4 includes a receiving buffer 4A, a text buffer 4B and an image buffer 4C. The receiving buffer 4A stores text data received from an external source. The text buffer 4B holds print data composed of page-by-page text data and the print format. The image buffer 4C accommodates image data, which is part of the print data.

The key panel 10 comprises a reprint key 10A, a font setting key 10B and a layout setting key 10C in addition to conventional print-related keys.

A register 4D has the structure shown in FIG. 2. Register 4D accommodates data related to the print format, such as the font type, print layout, sheet size, magnification factor, and color. The font type may be Ming typeface, italic, Gothic, courier, etc. The print layout includes such factors as tabulation, margins and line spacing. As its name implies, the sheet size is the size of the paper sheet, on which target print data is printed, such as A4 or letter. The magnification factor is a magnifying factor at which the target print data is magnified or contracted for printing. Color designation is in effect when print data includes graphic information for color printing.

The operation of the laser printer engine 7 is controlled by the controller 1 interpreting the print data received from the host computer 5. How the control program of the controller 1 works will now be described with reference to FIG. 3.

When the host computer issues a print command to the controller 1, the controller 1 is started. On receiving the print command, the controller 1 carries out initialization such as the setting of the print layout and the deletion of previous data from the RAM (S1).

The controller 1 then transmits the print data received from the host computer 5 to the RAM 4 via the I/O interface 6. The received text data is stored temporarily in the receiving buffer 4A of the RAM 4 (S2).

The controller 1 moves the text data from the receiving buffer 4A to the text buffer 4B. The print data thus moved by the controller 1 is associated with the print format stored in the register 4D, the controller always acting under control of the CPU 2 in accordance with the program stored in the ROM 3. The print data in the text buffer 4B is converted into image data in a dot pattern for storage into the image buffer 4C (S3). The receiving buffer 4A receives new text data from the host computer 5 consecutively and, as needed, the CPU 2 places the data into the image buffer 4C as described.

When the print data accumulated in the image buffer 4C reaches a predetermined amount (e.g., equivalent to one printout page; Yes in S4), the CPU 2 stops receiving the print data. The print data of one page is sent via the printer engine interface 8 to the laser printer engine 7 for printing (S5).

When the single page of print data is printed, the CPU 2 checks in S6 to see if the print operation is to be terminated. If further print data is being sent from the host computer 2 (No in S6), the image buffer 4C is cleared (S12). In that case, S2 is reached again in which the controller 1 starts storing text data of the next page into the receiving buffer 4A. Likewise, further data is stored one page at a time into the image buffer 4C for printing.

When the current print operation has come to an end (Yes in S6), the image buffer 4C in the RAM 4 still contains the last page of print data. That one page may be reprinted if the operator pushes the reprint key 10A on the key panel 10 (No in S7; Yes in S10; and S11).

The operator may wish to reprint the last page using a font and/or print layout that is different from that used in the preceding printing. In that case, the operator operates the font setting key 10B and/or layout setting key 10C on the key panel 10 to designate the desired settings. The CPU 2 detects the change made to the previous print format stored in the register 4D (Yes in S7). The newly established print format is placed in the register 4D. In accordance with the control program in the ROM 3, the CPU 2 changes the print format held in the text buffer 4B of the RAM 4 (S8). The print data composed of the changed print format and text data is converted into image data in a dot pattern for storage into the image buffer 4C (S9).

If the operator pushes the reprint key 10A (Yes in S10), the reprint operation is carried out (S11). That is, the CPU causes the single page of image data in the image buffer 4C to be output therefrom and sent to the laser printer engine 7 via the printer engine interface 8 for the reprint operation. As a result, a new printout sheet having the same text contents as the most recently printed page is printed in the desired new print format and output.

As described, the embodiment of the invention allows the print data held in the text buffer 4B to be changed according to a desired new print format set independently of the host computer, the print data being converted accordingly into an appropriate dot pattern for storage into the image buffer 4C. Where the print format is modified, the operator needs only to push the reprint key 10A to acquire easily a printout in the desired format in a short time.

Although the above description contains many specificities, these should not be construed as limiting the scope of the invention but as merely providing illustrations of the presently preferred embodiment of the invention. For example, the change of the print format is not limited to the font or print layout; the sheet size, magnification factor and color designation may also be changed.

The invention is not limited to reprinting the most recent page of the print data. If the printing apparatus comprises a memory capable of storing a plurality of pages of print data, the pages are retained after printing and may be reprinted as needed in the manner described. When the reprint operation is to be performed by the inventive printing apparatus after a change in the print format, the operator operates the key panel 10 appropriately to select both a desired print format and text data from among the print data stored in the memory. The CPU 2 places into the text buffer 4B the designated print data from the memory in accordance with the newly selected print format. The print data is converted into image data in a dot pattern for storage into the image buffer 4C. From there, the print data is sent to the laser printer engine 7 via the printer engine interface 8 for reprinting. In this manner, the operator may easily acquire a single page or a plurality of pages of the most recent print data in a desired new format.

What is claimed is:

1. A printing apparatus, comprising:
   a memory for storing at least one printout page of print data fed from an external device;
   printing means for printing at least a first printing of the print data stored in said memory;
   print format setting means for setting a print format in which the print data stored in said memory is printed;
   print control means for reading the print data from said memory for printing by said printing means; and
   print data converting means for modifying the print data to a changed print format if the print format for the print data stored in said memory is changed by said print format setting means, wherein said printing means subsequently prints the modified print data as a second printing such that information content of the first printing and the second printing are identical but a presentation is changed.

2. The printing apparatus according to claim 1, wherein said print control means reads the print data for the second printing from said memory independently of the external device for printing by said printing means.

3. The printing apparatus according to claim 1, wherein said memory has a register for storing the print format set by said print format setting means, said printing apparatus further comprising setting change detecting means for monitoring contents of said register to detect any print format change that may be made.

4. A printer, comprising:
   a control processing unit;
   a control panel;
   a first memory for storing a control program for the printer;
   a second memory having plurality of areas for separately storing at least data input from an external source, print format data, and image data for printing developed from the data input and the print format data;
   a printer interface; and
   a print engine for printing the image data, wherein said control panel includes a reprint key and at least one format key for establishing and changing the print format data, wherein said control processing unit controls the print engine to print the image data based on original image data as a first printing, said reprint key permitting a second printing of a one of the image data and an altered image data when said at least one format key is used to change the print format data.

5. The printer as claimed in claim 4, wherein said at least one format key allows setting of at least one of font, print layout, sheet size, magnification factor and color.

6. The printer as claimed in claim 4, wherein said second memory stores text data for one page.

7. The printer as claimed in claim 4, wherein said second memory stores text data for a plurality of pages.

8. A printing apparatus, comprising:

a receiving buffer for storing text data from an external device;

a register for storing print format data;

a text buffer for storing print data;

an image buffer for storing image data as a dot pattern that is developed from the print data;

printing means for printing the image data;

print format setting means for setting print format data, the set print format data being stored in said register as the print format data; and control means for replacing existing print format data stored in said register based on the print format data set by said print format setting means, wherein said control means adjusts the print data stored in said text buffer using the print format data set by said print format setting means for a subsequent printing.

9. The printing apparatus as claimed in claim 8, wherein the print format includes at least one of a font and a print layout.

10. The printing apparatus as claimed in claim 9, wherein said print data format setting means includes at least one of a font setting key and a print layout setting key.

11. The printing apparatus as claimed in claim 8, further comprising detecting means for monitoring contents of said register to detect print format changes.

12. The printing apparatus as claimed in claim 8, wherein said image buffer stores image data for one page.

13. The printing apparatus as claimed in claim 11, wherein said control means adjusts the print data stored in said text buffer using the print format data set by said print format setting means when said detecting means detects that a print format change is made.

14. The printing apparatus as claimed in claim 8, wherein the print format includes at least one of a font, a print layout, a sheet size, a magnification factor and a color.

* * * * *